(12) United States Patent
Killpatrick (10) Patent No.: US 6,476,918 B1
(45) Date of Patent: Nov. 5, 2002

(54) DITHER CONTROL SYSTEM FOR A RING LASER GYRO

(75) Inventor: Joseph E. Killpatrick, St. Anthony, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/886,570

(22) Filed: Jun. 21, 2001

(51) Int. Cl.$^7$ ................................................ G01C 19/68
(52) U.S. Cl. ........................................ 356/472; 356/475
(58) Field of Search .............................. 356/472, 475, 356/473, 459; 372/94

(56) References Cited

U.S. PATENT DOCUMENTS

| | | |
|---|---|---|
| 3,373,650 A | 3/1968 | Killpatrick |
| 4,445,779 A | 5/1984 | Johnson |
| 4,597,667 A * | 7/1986 | Curby et al. ............... 356/476 |
| 4,751,718 A | 6/1988 | Hanse et al. |
| 4,826,320 A | 5/1989 | Callaghan et al. |
| 4,847,855 A | 7/1989 | Derry et al. |
| 4,864,586 A | 9/1989 | Lind |
| 5,088,824 A | 2/1992 | Killpatrick et al. |
| 5,163,065 A | 11/1992 | Ford |
| 5,173,745 A | 12/1992 | Hanse |
| 5,225,889 A | 7/1993 | Fritze et al. |
| 5,249,031 A | 9/1993 | Fritze et al. |
| 5,406,369 A | 4/1995 | Killpatrick et al. |
| 5,486,920 A | 1/1996 | Killpatrick et al. |

OTHER PUBLICATIONS

Author: Joseph E. Killpatrick, Article Title: The Digital Laser Gyro found in the Scientific Honeyweller, 1996 Sensors Issue, pp. 80–87 month unknown.

* cited by examiner

Primary Examiner—Que T. Le
(74) Attorney, Agent, or Firm—Dennis C. Bremer (57) ABSTRACT

A dither control system for a laser gyro having a dither motor for dithering the laser gyro through a desired angular displacement, known as the command angle, in response to a drive signal. In order to help avoid saturation of the laser gyro, the dither control system reduces the command angle by command angle reduction data when the average drive signal applied to the dither motor exceeds a maximum drive value until the command angle reduction data reaches zero. The command angle reduction value is calculated by integrating the difference between the average drive signal and the maximum drive value.

22 Claims, 6 Drawing Sheets

DITHER CONTROL SYSTEM FOR A RING LASER GYRO

TECHNICAL FIELD

The present invention relates generally to ring laser gyros. In particular, the present invention relates to a dither control system for a ring laser gyro.

BACKGROUND OF THE INVENTION

Ring laser gyros, also often called laser gyros or laser angular rater sensors, are well known. One example of a ring laser gyro is disclosed in U.S. Pat. No. 4,751,718 issued to Hanse, et al., which is incorporated herein by reference. Present day ring laser gyros include a thermally and mechanically stable laser block having a plurality of formed cavities for enclosing a gap. Mirrors are placed at the extremities of the cavities for reflecting laser beams and providing an optical closed-loop path.

Associated with such laser gyros is an undesirable phenomenon called lock-in. During lock-in the counter-propagating laser beams tend to lock together to a common frequency. The lock-in phenomenon has been typically addressed by rotationally oscillating or dithering such laser gyros. The rotational oscillation is typically provided by a dither motor.

Known dither motors, such as those shown in U.S. Pat. No. 4,751,718, often have a suspension system which includes, for example, an outer rim, a central hub member and a plurality of dither motor reeds which project radially from the hub member and are connected between the hub member and the rim. Conventionally, a set of piezoelectric elements which serve as an actuator is connected to the suspension system. When actuated through the application of an electrical signal to the piezoelectric elements, the suspension system operates as a dither motor which causes the block of the laser gyro to oscillate angularly at the natural mechanical resonant frequency of the suspension system. This dither motion is superimposed upon the inertial rotation of the laser gyro in inertial space. Such dither motors may be used in connection with a single laser gyro, or to dither multiple laser gyros. Various approaches to recover inertial rotation data free from dither effects are also known.

It is also known that if the laser gyro is dithered through a constant angular displacement at a constant frequency and amplitude, "dynamic" lock-in effects, in which the propagating beams lock at a common frequency that is a function of the dither frequency will occur. By modulating the dither drive with random noise, the dynamic lock-in effects can be reduced. Moreover, by modulating the dither drive with random noise, the small errors that are introduced each time the gyro reverses direction when dithered can be reduced. Laser gyros using noisy dither are disclosed in U.S. Pat. Nos. 5,249,031 and 5,225,889, both issued to Fritze et al. These gyros include a dither pickoff that measures angular displacement of the gyro block and from which a dither pickoff signal representative of the measured angular displacement is generated. An error signal is calculated from the difference between a desired angular displacement and the dither pickoff signal. The error signal is then modulated with random noise, and the resulting signal is used to drive the dither motor. Also, in some conventional laser gyros, the error signal is integrated in order to generate (for instrumentation purposes only) a signal representative of the average drive signal provided to the dither motor.

In order to randomly dither the gyro block to properly reduce dynamic lock-in effects, that part of the drive signal corresponding to the noise will be significantly larger than the part corresponding to the error signal. For example, the drive signal ultimately applied to the dither motor can have a peak-to-peak range of about 300 V. In order to randomly dither the sensor, about 100 V of the drive signal's amplitude range is needed for adding noise. Under normal operating conditions, the error signal component of the drive signal has a peak-to-peak amplitude of about 20 V. Under such conditions, a sufficient amount of the drive signal's amplitude range is available to accommodate the noise component. However, under lossy conditions (for example, when the gyro is operated at relatively low temperatures), the error signal component of the drive signal can become so large that an insufficient amount of the drive signal's amplitude range is available to accommodate the noise component fully. This condition is referred to as "saturation" of the dither drive, and reduces the effectiveness of noisy dither in reducing errors that are introduced due to dynamic lock-in effects.

There is a continuing need, therefore, for improved dither control systems that reduce the occurrence of dither drive saturation.

SUMMARY OF THE INVENTION

The dither control system of the present invention reduces the command angle in order to help avoid saturation when the command angle becomes too high. Moreover, the average drive that is output by the system to satisfy the drive requirements are read with more accuracy and the errors that occur due to increased drive requirements at low and high temperatures can be reduced with the dither control system of the present invention.

The dither control system of the present invention can be used in a dithered ring laser gyro having a pickoff source for providing pickoff data representative of a measured dither angle and a command angle source for providing command angle data representative of a desired command angle. The dither control system comprises means for generating modulated data as a function of dither error data and noise. The dither control system further comprises means for generating average drive data as a function of the dither error data and means for generating dither drive data as a function of the modulated data. The dither control system also includes a maximum drive source for generating maximum drive data as a function of a maximum desired value of the average drive data and means for generating command angle reduction data as a function of the average drive data and the maximum drive data. In addition, the dither control system includes means for generating the dither error data as a function of the pickoff data, the command angle data, and the command angle reduction data.

In one embodiment, the dither control system of the present invention includes electronic memory for storing data, including software, and a digital controller coupled to the pickoff source and the electronic memory. In this embodiment, the command angle source, the modulated data generating means, the average drive data generating means, the dither drive data generating means, the maximum drive source, the command angle reduction data generating means, and the dither error data generating means include software that is stored in the electronic memory and is executable by the digital controller.

Also, a dither control method is provided by the present invention. The dither control method can be used with a dithered ring laser gyro having a pickoff source for providing pickoff data representative of a measured dither angle and a command angle source for providing command angle data representative of a desired command angle. The dither control method of the present invention comprises generating modulated data as a function of dither error data and noise. The dither control method also includes generating average drive data as a function of the dither error data, and generating dither drive data as a function of the modulated data. In addition, the dither control system includes generating maximum drive data as a function of a maximum desired value of the average drive data, generating command angle reduction data as a function of the average drive and the maximum drive data, and generating the dither error data as a function of the pickoff data, the command angle data, and the command angle reduction data.

DETAILED DESCRIPTION OF THE PREFERRED EMBODIMENTS

Figure 1:
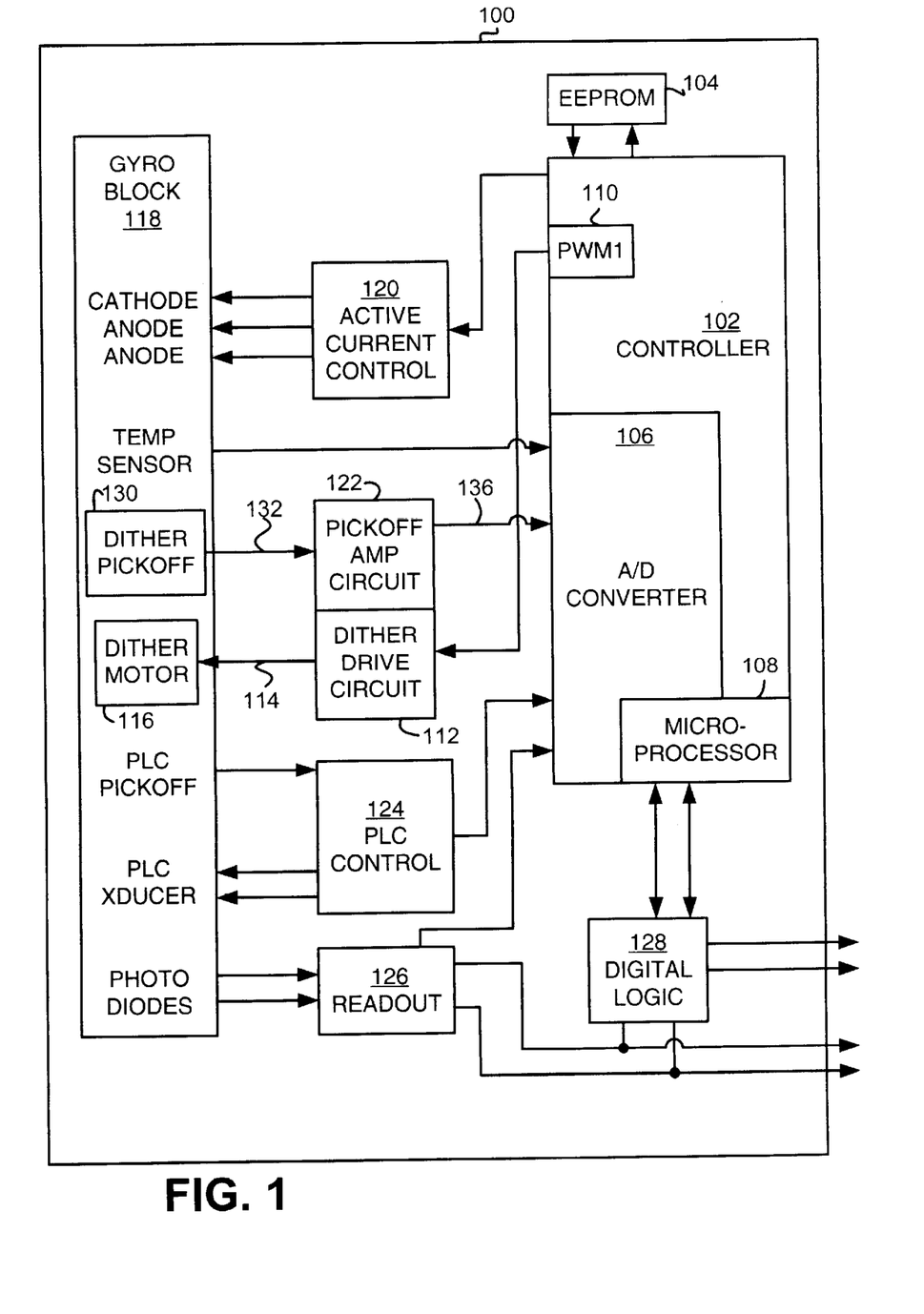
FIG. 1 is a block diagram of a laser gyro in which a dither control system of the present invention can be implemented.

A laser gyro 100 in which the dither control system of the present invention can be implemented is shown in FIG. 1 in simplified, block-diagram form. Laser gyro 100 includes a controller 102 that is operatively coupled to electronic memory 104. Controller 102 preferably is a microcontroller such as the Intel 80C196KC microcontroller, which has an on-board analog-to-digital (A/D) converter 106 and a microprocessor 108. The controller 102 contains three pulse width modulators (only one of which is shown in FIG. 1) that are used in this embodiment of the invention for various control functions. In particular, a pulse width modulator (PWM1) 110 is used for controlling a dither drive circuit 112 that generates a dither drive signal 114 for driving a dither motor 116 located on a laser gyro block 118. Memory 104 preferably is non-volatile programmable read only memory such as a conventional electrically erasable programmable read only memory (EEPROM) unit. A number of software modules are stored in memory 104 and are accessed from memory 104 and run by the microprocessor 108 contained within the controller 102 to initialize and control the controller 102. Moreover, the memory 104 also can hold data representative of a command angle, which is the desired average angular displacement (also referred to herein as the command angle) through which the laser gyro block 118 is to be dithered.

The laser gyro 100 also includes an active current control 120, pickoff amplifier circuit 122, a path length control (PLC) device 124, a readout 126, and digital logic 128. Located on the gyro block 118 is a dither pickoff 130, which conventionally comprises a piezoelectric element (PZT). The dither pickoff 130 senses the angular displacement (also referred to herein as the "pickoff angle") of the laser gyro block 118 and provides a dither pickoff signal 132 representative of the sensed angular displacement of the gyro block 118. The pickoff amplifier circuit 122 filters, conditions, and amplifies the dither pickoff signal 132 in a conventional manner to provide an amplified pickoff signal 136. The A/D converter 106 receives the amplified pickoff signal 136 and converts the amplified dither pickoff signal 136 into digital data (expressed in volts) representative of the dither pickoff signal 132. Preferably, the controller 102 then gain converts the digital representation of the dither pickoff signal 132 by a multiplier so that the digital representation of the dither pickoff signal is expressed in counts instead of volts.

Laser gyros of the same general type as the laser gyro 100 are generally known and are described in detail in U.S. Pat. Nos. 5,225,889, 5,249,031, and 5,406,369, entitled LASER GYRO DITHER DRIVE, RING LASER GYRO DITHER STRIPPER, and LASER GYRO MICROPROCESSOR CONFIGURATION AND CONTROL, respectively, all of which are incorporated herein by reference.

Figure 2:
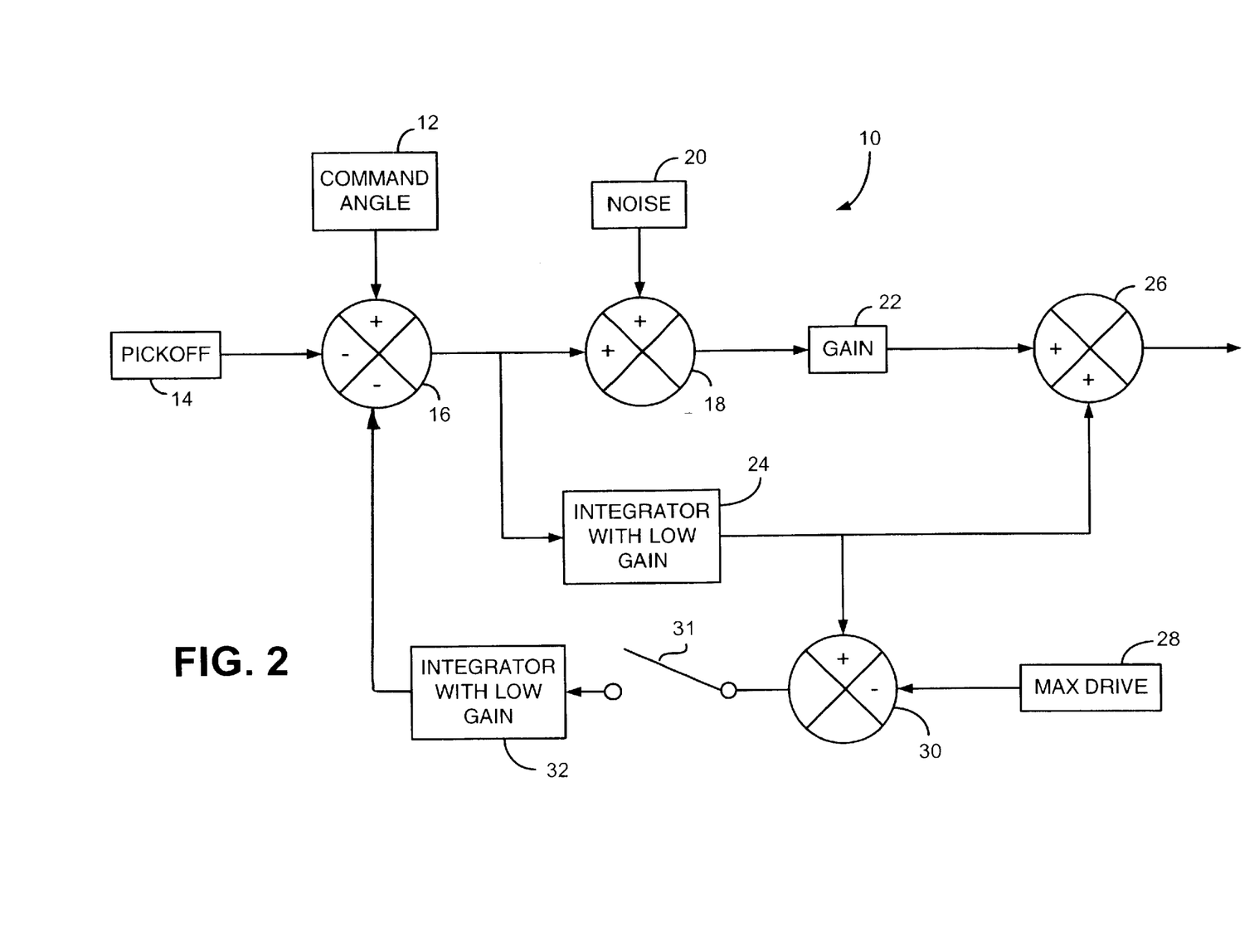
FIG. 2 is a block diagram of a dither control system of the present invention.

A dither control system 10 according to the present invention, which can be implemented in the laser gyro 100, is shown in FIG. 2 in high-level, block-diagram form. The digital control system 10 includes a command angle source 12 for providing command angle data and a pickoff source 14 for providing pickoff data. The command angle data is representative of the command angle, and the pickoff data is representative of the pickoff angle of the laser gyro block 118 of FIG. 1 at a given point in time. The command angle data and the pickoff data are used in a closed, negative feedback loop to produce dither error data that is used to drive the dither motor 116 of FIG. 1. As shown in FIG. 2, a summing junction 16 generates the dither error data as a function of the command angle data, the pickoff data, and command angle reduction data (described below). Preferably, the summing junction 16 generates the dither error data by subtracting the pickoff data and the command angle reduction data, if any, from the command angle data.

A summing junction 18 receives the dither error data and sums the dither error data with noise, preferably random, from noise source 20. The output of the summing junction 18 is then multiplied by a gain element 22 to generate modulated output data. Preferably, the gain element 22 is variable so that the loop gain of the system 10 can be varied to adjust the loop time constants. For example, the gain element 22 preferably has a greater gain at power-on of the system 10 to shorten the loop response times, and then at some point after power-on (for example, after the first ten seconds), the gain of gain element 22 is reduced to increase the loop time constants and to give better filtering.

The dither control system 10 also includes a first low-gain integrator 24 that integrates the dither error data in order to generate average drive data. If the noise has a random distribution with a mean of zero, integrating the dither error data can reduce the effect that the random noise has on the average drive data because the sum of the portion of the dither error data that is attributable to the random noise should approach zero over time. Thus, the average drive data that results from integrating the dither error data in the integrator 24 is representative of the average of the dither drive data (described below) that is output by the system 10 to satisfy the drive requirements for the specified command angle data.

A summing junction 26 generates the dither drive data as a function of the modulated output data. The dither drive data is used by a dither drive circuit 112 as shown in FIG. 1 for driving the dither motor 116. Preferably, as shown in FIG. 2, the summing junction 26 generates the dither drive data by adding the average drive data to the modulated output data. The integration of the dither error data by integrator 24 substantially eliminates the average error that may be introduced into the system 10, for example when the system 10 has a relatively high loop gain. That is, the function of the integrator 24 is to measure the average drive data so that it can be used to reduce, preferably to zero, the error between the average command angle and the average actual angle through which the gyro is dithered.

The dither control system 10 also includes a maximum drive source 28 for generating maximum drive data as a function of a maximum desired value of the average drive data. The maximum drive data is a stored parameter. Preferably, the maximum desired value of the average drive data is related to the point at which the dither control system 10 saturates. The maximum drive data can be substantially constant or be made to vary as a function of factors such as desired margins, etc. A typical maximum desired value would be about 50% to about 75% of the drive capability.

A summing junction 30 provides, via switch 31, the difference between the average drive data and the maximum drive data to a second low-gain integrator 32 only when the average drive data is greater than the maximum drive data or the command angle reduction data that is generated by the second low-gain integrator 32 is greater than a predetermined value, preferably zero. Once the summing junction 30 begins providing the difference between the average drive data and the maximum drive data to the integrator 32, the integrator 32 integrates the difference to generate the command angle reduction data. The command angle reduction data is used to reduce the command angle used by the dither control system 10 in order to help avoid the occurrence of saturation. As the command angle is reduced by the command angle reduction data, the average of the dither drive data output by the system 10 will be reduced. As a result, the average drive data generated by the first integrator 24 and the difference between the average drive data and the maximum drive data will also be reduced. When the average drive data is reduced below the maximum drive data, the difference will be negative, which causes the command angle reduction data output by the integrator 32 to be reduced. The integrator 32 integrates the average drive data to generate the command angle reduction data until the output of the integrator 32 (that is the command angle reduction data) reaches zero, which is when the command angle is no longer too large for the maximum desired value of the average drive data of the system.

One embodiment of software for implementing the dither control system 10 in the laser gyro 100 is shown in the high-level flow diagrams of FIGS. 3–6. After application of power to the laser gyro 100, the controller 102 and microprocessor 108 perform start-up functions (not shown in FIGS. 3–6) that prepare and initialize the laser gyro 100, controller 102, and microprocessor 108 for operation. After the A/D converter 106 receives and converts the amplified pickoff signal 136 from the dither pickoff 130, control passes to step 200 with the pickoff data in a digital form expressed in volts.

Figure 3:
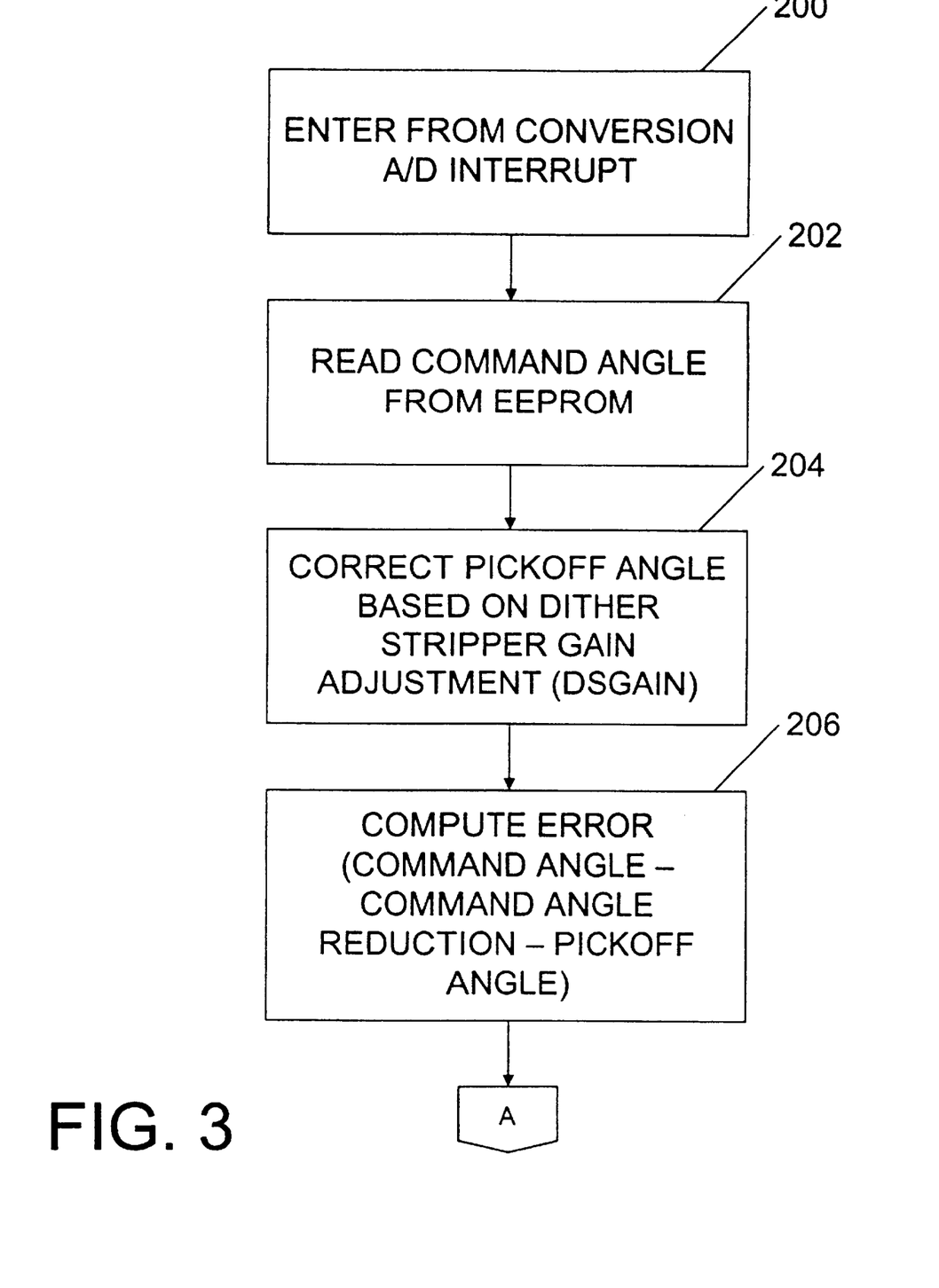
FIGS. 3–6 are high-level flow diagrams of software for implementing portions of the dither control system of the present invention in the laser gyro of FIG. 1.

In step 202, the microprocessor 108 reads the command angle data from memory 106. Preferably, the command angle data is a single value, expressed in counts, representing a desired average angular displacement through which the gyro block 118 is to be dithered. In step 204, the pickoff angle data is converted from volts to counts by multiplying the pickoff data by an appropriate conversion factor, such as the dither stripper gain adjustment DSGAIN described in U.S. Pat. No. 5,249,031. The conversion factor DSGAIN, also referred to as K, is expressed in counts/volts units and is used in the dither stripper described in U.S. Pat. No. 5,249,031. The conversion factor DSGAIN is constantly updated by the dither stripper and gives a direct, calibrated correlation between dither pickoff analog volts and equivalent digital readout counts. The pickoff data is multiplied by the conversion factor DSGAIN to obtain a digital representation of the pickoff data expressed in counts. However, if subsequent processing is to be done in volts instead of counts, step 204 would be modified to convert the command angle data to volts by dividing the command angle data by the conversion factor.

In step 206, dither error data is computed by reducing the command angle data by the command angle reduction data and then subtracting the pickoff data from the command angle data. Then, in step 208 (shown in FIG. 4), the dither error data is integrated with low gain to calculate the average drive data. Low gain is used in the integration to provide a long time filter to the data and, therefore, to measure the average value of the error. Specifically, the dither error data is multiplied by 1028 (which is $2^{11}$) and the result is added to a 32-bit register in which the average drive data is calculated. The upper 16 bits of the 32-bit register are used as the average drive data. The net gain for the integration step 208 is about 1/64. Integrating in this manner prevents oscillations and small deviations from being introduced into the system 10 (i.e., the loop is stable and robust).

Figure 4:
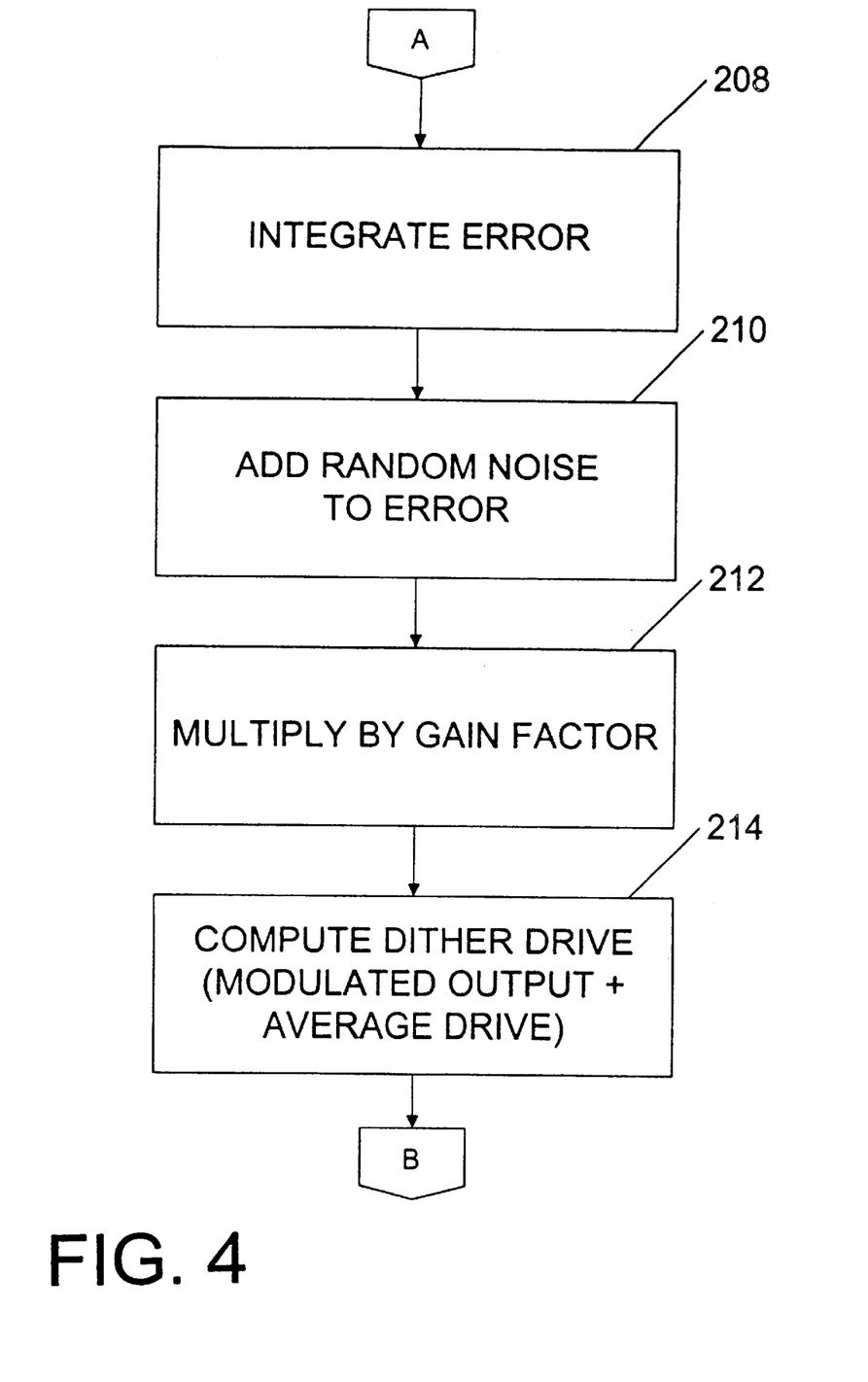
Figure 5:
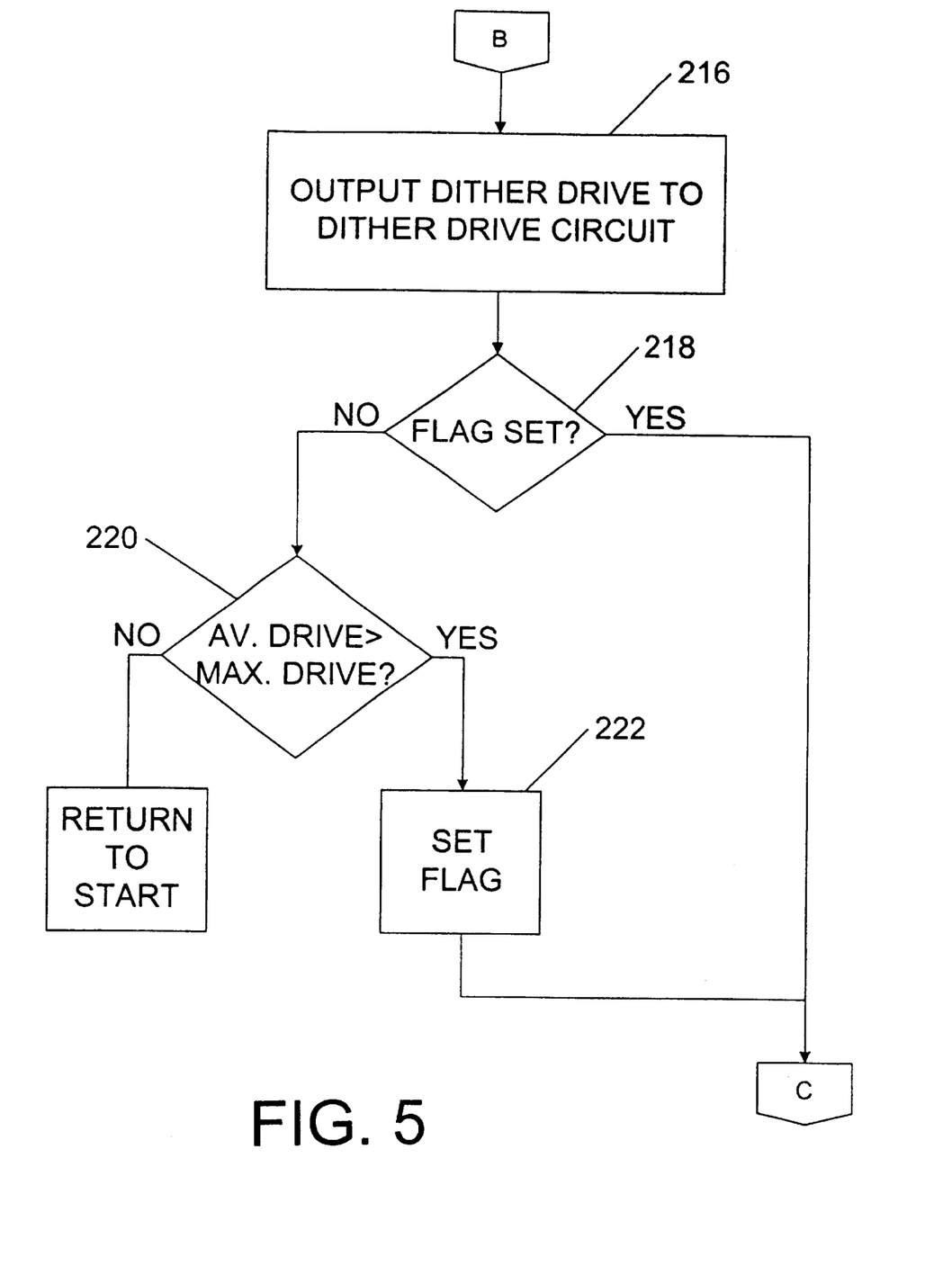

The process then flows to step 210 where noise, for example random noise having a Guassian or normal distribution, is added to the dither error data. In step 212, the results from step 210 are multiplied by a gain factor. The gain factor can be variable so that the loop gain and time constants can be adjusted. Also, the gain factor can be adjusted in response to data such as the command angle reduction data to alter the loop gain when the average drive data is greater than the maximum drive data.

In step 214 the dither drive data is computed by adding the average drive data to the modulated output data from step 210. In step 216 (shown in FIG. 5), the dither drive data is then output to the dither drive circuit 112 of FIG. 1 so that the dither drive circuit 112 can generate the dither drive signal 114 to drive the dither motor 116. In step 218, a flag representing whether command angle reduction data was generated during the last time the process was executed (that is, the loop containing the integrator 32 is "closed") is checked. If the flag is set, the process flows to step 224. If the flag is not set and command angle reduction data was not generated the last time the process was executed, the process flows to step 220 where the average drive data is compared to the maximum drive data to see if the average drive data is greater than the maximum drive data. If the average drive data is not greater than the maximum drive data, the process returns to step 200. If the average drive data is greater than the maximum drive data, the process proceeds to step 222 where the flag is set and then to step 224 where command angle reduction data is computed.

In step 224 (shown in FIG. 6), the difference between the average drive data and the maximum drive data is integrated to calculate the command angle reduction data. Specifically, the difference is integrated with low gain by multiplying the difference between the average drive data and the maximum drive data by 2056 (which is $2^{12}$ and which simulations have suggested will provide the desired loop response and robustness) and then adding the result to a second 32-bit register in which the command angle reduction data is calculated. The upper 16 bits of the second 32-bit register are used as the command angle reduction data. The net gain for the integration step 224 is about 1/32. Integrating in this manner smoothes the command angle reduction data so that small deviations in average drive data are not reflected in the command angle reduction data.

Figure 6:
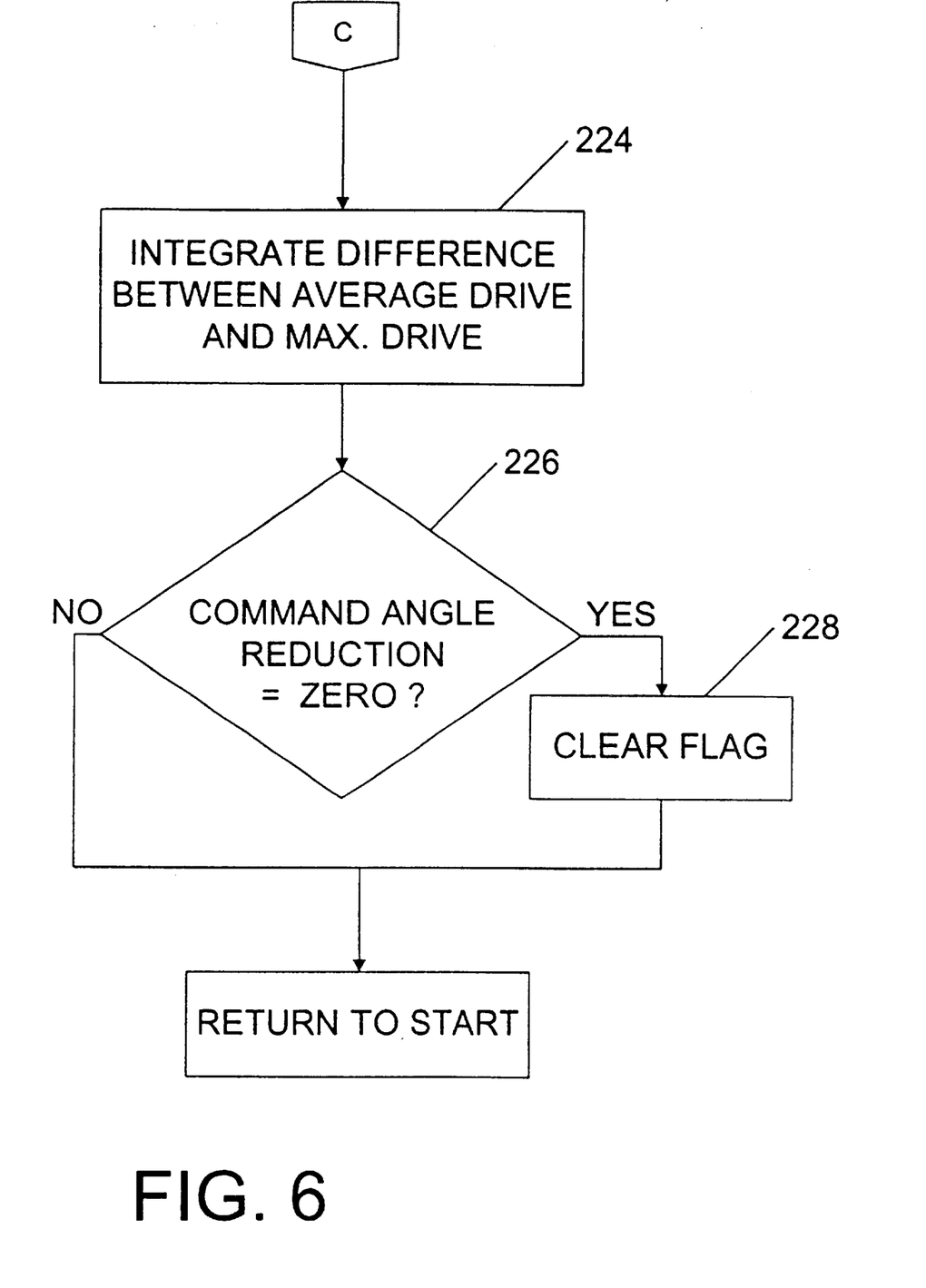

The process then flows to step 226, where the command angle reduction data is checked to see if it is equal to a predetermined value such as zero. If the command angle reduction data is equal to the predetermined value, the flag is cleared in step 228 to indicate that the loop containing the integrator 32 is "open." Then, the process returns to step 200 and processes the next pickoff angle that is measured.

Although the present invention has been described with reference to preferred embodiments, workers skilled in the art will recognize that changes may be made in form and detail without departing from the spirit and scope of the invention. For example, workers skilled in the art will recognize that those portions of the dither control system 10 of the present invention described herein above as being implemented as software could alternatively be implemented in hardware in a conventional manner. Likewise, those portions of the dither control system 10 implemented in hardware could alternatively be implemented as software.

What is claimed is:

1. A dither control system for a dithered ring laser gyro having a pickoff source for providing pickoff data representative of a measured dither angle and a command angle source for providing command angle data representative of a desired command angle, comprising:

modulated data generating means for generating modulated data as a function of dither error data and noise;

average drive data generating means for generating average drive data as a function of the dither error data;

dither drive data generating means for generating dither drive data as a function of the modulated data;

a maximum drive source for generating maximum drive data as a function of a maximum desired value of the average drive data;

command angle reduction data generating means for generating command angle reduction data as a function of the average drive and the maximum drive data; and dither error generating means for generating the dither error data as a function of the pickoff data, the command angle data, and the command angle reduction data.

2. The dither control system of claim 1, wherein the dither drive data generating means generates the dither drive data as a function of the modulated data and the average drive data.

3. The dither control system of claim 2, wherein the dither drive data generating means includes means for summing the modulated data and the average drive data.

4. The dither control system of claim 1, wherein the modulated data generating means generates the modulated data as a function of the dither error data and random noise.

5. The dither control system of claim 1, wherein the average drive data generating means includes means for integrating the dither error data in order to generate the average drive data.

6. The dither control system of claim 1, wherein the command angle reduction data generating means includes:

means for summing the average drive data and the maximum drive data to generate integrating input data; and means for integrating the integrating input data to generate the command angle reduction data.

7. The dither control system of claim 6, wherein the command angle reduction data generating means includes means for comparing the average drive data to the maximum drive data so that the integrating input data is integrated when the average drive data is greater than the maximum drive data until the command angle reduction data reaches a predetermined value.

8. The dither control system of claim 7, wherein the predetermined value is about zero.

9. The dither control system of claim 1, wherein the dither error data generating means includes means for summing the pickoff data, the command angle delta data, and the command angle data.

10. The dither control system of claim 1, further comprising:

electronic memory for storing data including software; and a digital controller coupled to the pickoff source and the electronic memory; and wherein the modulated data generating means, the average drive data generating means, the dither drive data generating means, the maximum drive source, the command angle reduction data generating means, and the dither error data generating means include software that is stored in the electronic memory and is executable by the digital controller.

11. The dither control system of claim 10, wherein the digital controller includes a first register in which the command angle reduction data generating means generates the command angle reduction data.

12. The dither control system of claim 11, wherein the first register is an N-bit register and the command angle reduction data generating means generates the command angle reduction data as a function of N/2 bits of the first register.

13. The dither control system of claim 10, wherein the digital controller includes a second register in which the average drive data generating means generates the average drive data.

14. The dither control system of claim 13, wherein the second register is an N-bit register and the average drive data generating means generates the average drive data as a function of N/2 bits of the second register.

15. A dither control method for dithering a ring laser gyro having a pickoff source for providing pickoff data representative of a measured dither angle and a command angle source for providing command angle data representative of a desired command angle, comprising:

generating modulated data as a function of dither error data and noise;

generating average drive data as a function of the dither error data;

generating dither drive data as a function of the modulated data;

generating maximum drive data as a function of a maximum desired value of the average drive data;

generating command angle reduction data as a function of the average drive and the maximum drive data; and generating the dither error data as a function of the pickoff data, the command angle data, and the command angle reduction data.

16. The dither control method of claim 15, wherein the dither drive data generating step generates the dither drive data as a function of the modulated data and the average drive data.

17. The dither control method of claim 15, wherein the modulated data generating step generates the modulated data as a function of the dither error data and random noise.

18. The dither control method of claim 15, wherein the average drive data generating step includes integrating the dither error data in order to generate the average drive data.

19. The dither control method of claim 15, wherein the command angle reduction data generating step includes summing the average drive data and the maximum drive data to generate integrating input data and integrating the integrating input data to generate the command angle reduction data.

20. The dither control method of claim 19, wherein the command angle reduction data generating step includes comparing the average drive data to the maximum drive data so that the integrating input data is integrated when the average drive data is greater than the maximum drive data until the command angle reduction data reaches a predetermined value.

21. The dither control method of claim 20, wherein the predetermined value is about zero.

22. The dither control method of claim 15, wherein the dither error data generating step includes summing the pickoff data, the command angle delta data, and the command angle data.

* * * * *